US006778526B1

(12) United States Patent
Brown et al.

(10) Patent No.: US 6,778,526 B1
(45) Date of Patent: Aug. 17, 2004

(54) HIGH SPEED ACCESS BUS INTERFACE AND PROTOCOL

(75) Inventors: Benjamin J. Brown, Chichester, NH (US); Richard P. Modelski, Hollis, NH (US); John P. Roy, Brookline, NH (US)

(73) Assignee: Nortel Networks Limited (CA)

( * ) Notice: Subject to any disclaimer, the term of this patent is extended or adjusted under 35 U.S.C. 154(b) by 705 days.

(21) Appl. No.: 09/742,300

(22) Filed: Dec. 22, 2000

(51) Int. Cl.[7] .............................................. H04L 12/28
(52) U.S. Cl. ....................... 370/351; 370/438; 710/100
(58) Field of Search ................................ 370/229, 236, 370/351–3, 389, 395.1, 398, 419, 430, 458, 463, 503, 509–14, 520, 522; 710/100, 101, 36, 126, 129, 131, 260, 263, 266

(56) References Cited

U.S. PATENT DOCUMENTS

| | | | |
|---|---|---|---|
| 6,202,108 B1 * | 3/2001 | Autechaud et al. ........... 710/61 |
| 6,275,499 B1 * | 8/2001 | Wynn et al. ................. 370/438 |
| 6,466,589 B1 * | 10/2002 | Chou ......................... 370/518 |
| 6,633,880 B1 * | 10/2003 | Modelski et al. ........... 707/100 |
| 6,665,755 B2 * | 12/2003 | Modelski et al. ........... 710/100 |
| 6,684,300 B1 * | 1/2004 | Modelski et al. ........... 711/149 |
| 2001/0043614 A1 * | 11/2001 | Viswanadham et al. .... 370/469 |
| 2002/0083297 A1 * | 6/2002 | Modelski et al. ............. 712/18 |
| 2002/0116442 A1 * | 8/2002 | Modelski et al. ........... 709/106 |
| 2002/0116449 A1 * | 8/2002 | Modelski et al. ........... 709/203 |
| 2002/0116587 A1 * | 8/2002 | Modelski et al. ........... 711/154 |
| 2002/0120798 A1 * | 8/2002 | Modelski et al. ........... 710/107 |
| 2002/0120828 A1 * | 8/2002 | Modelski et al. ........... 712/200 |

* cited by examiner

Primary Examiner—David Vincent
(74) Attorney, Agent, or Firm—Steubing McGuinness & Manaras LLP

(57) ABSTRACT

A high speed access bus interface for a communications network. The interface allows uni-directional transfer of data packets at a fast path processing rate of about 10 gigabits per second. The interface uses a master port and a slave port in a chip to chip data transfer scheme. The master and slave ports may have one or more than one data channel for transferring data packets. The master port includes a clock signal for synchronizing the transfer from the master port to the slave port. The slave may send an asynchronous signal to the master port in order to initiate the master port to stop or stall the pipeline transfer of data packets until space is made available in the slave port buffer. In addition to the clock synchronization, the interface utilizes an enable signal, a start of packet signal, an end of packet signal, an error signal (if necessary), a last valid byte signal, and a parity bit signal to identify, address, each data packet in the data stream. If a processing error occurs, the master port error signal to the slave port also initiates the slave port to disregard the previous data packet. The operating frequency of 50 MHz allows the data packet transfer to exceed 10 gigabits per second.

20 Claims, 4 Drawing Sheets

HIGH SPEED ACCESS BUS INTERFACE AND PROTOCOL

BACKGROUND OF THE INVENTION

1. Field of the Invention

This invention generally relates to the field of data communications and data processing architectures. More particularly, the present invention relates to a high speed chip to chip interface and protocol for fast path processing of data packets in a route switch mechanism.

2. Description of Related Art and General Background

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. This provides only temporary relief as network wire speeds have increased exponentially recently (e.g., Ethernet's 10, 100, to 1,000 MBps increase) while processing speeds have traditionally improved, on average, by a factor of two every 18 months. It is clear that most of current solutions will run out of steam, as the faster media become the mainstream.

SUMMARY OF THE INVENTION

The present invention is provides fast chip to chip processing, in a route switch mechanism having a plurality of processors, that approximates a ten gigabits per second transfer rate. To achieve this end, the present invention provides a processor interface in each processor that transfers data, in the form of packets, to and from each processor across the bus a in a source synchronous model.

The present invention is configured to provide a fast path data packet transfer across a bus infrastructure in a switching mechanism. As such, the present invention includes a first port and a second port on each processor for establishing a uni-directional data flow path. The present invention further includes a synchronous clocking pulse generator for synchronizing the transfer of the data packets from the first port of a first processor to the second port of a second processor. This allows for fast chip to chip source synchronization, where each chip has a sourcing clock generator.

The present invention, therefore, may be directed to a method, a system, and one or more parts thereof, for fast path processing from chip to chip within the switching mechanism.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE EMBODIMENTS

The innovative teachings of the present application will be described with particular references to the present embodiments. However, it should be understood that this class of embodiments provides only a few examples of the many advantageous uses of the innovative teachings described herein. In general, statements made in the specification of the present application do not necessarily delimit any of the various claimed inventions. Moreover, some statements may apply to some inventive features but not to others.

The present invention generally relates to communication system architecture and, more particularly, to packet processing architecture employed within a communication network that provides fast path processing and enhanced flexibility/adaptability of packet processors. The inventive packet processing architecture will hereinafter be referred to as packet router mechanism.

Figure 1:
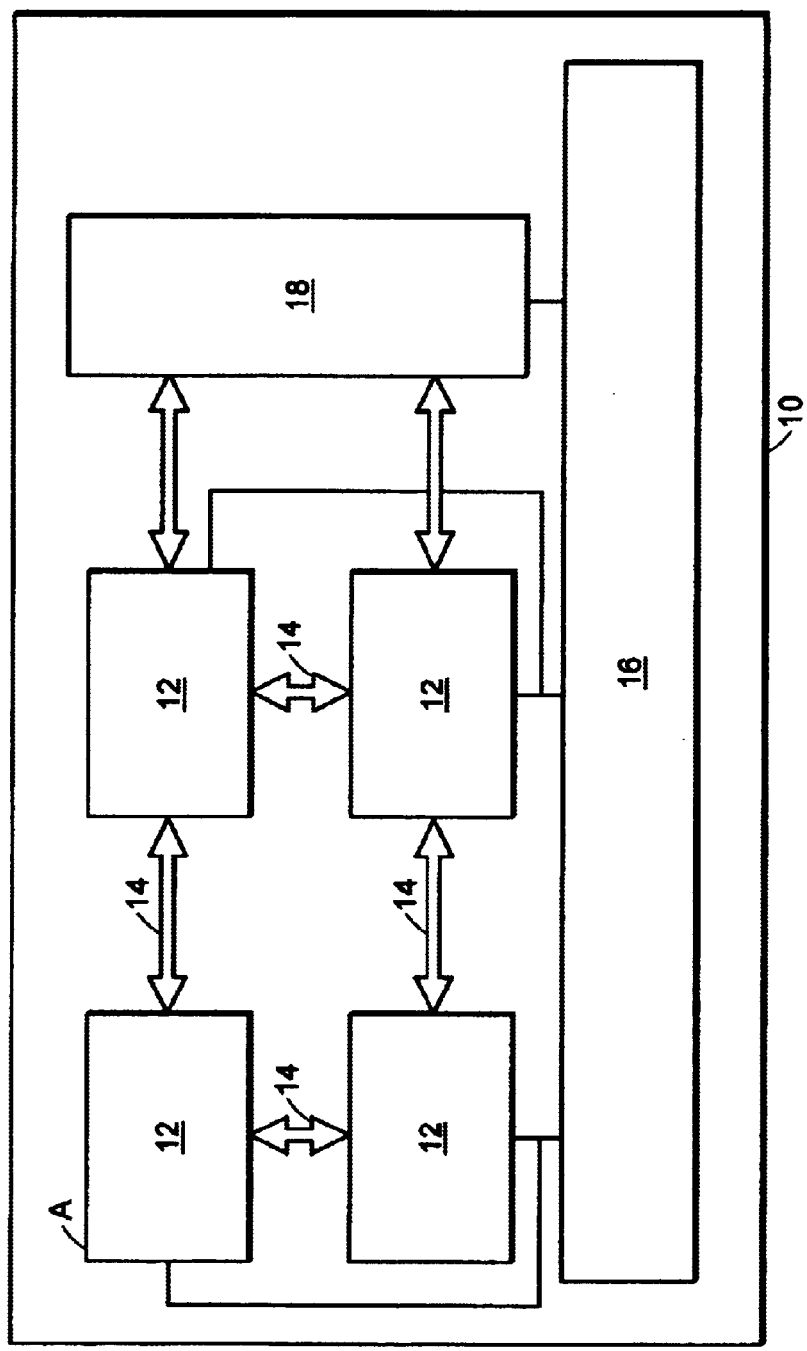
FIG. 1 is a block diagram of a switching router having plural processors and the high speed access bus interface according to the present invention.

Referring now to the drawings in greater detail, FIG. 1 shows a block diagram of a packet router host mechanism having plural processors and the high speed access bus interface for establishing linkage between the processors, as well as other components of the mechanism.

A packet router host mechanism 10 for switching data packets in a communications network. The packet router host mechanism 10 has a plurality of switching processors 12. The switching processors 12 each operate as multi-thread complex packet processors, as set forth in copending application, entitled ROUTE SWITCH PACKET ARCHITECTURE, filed on an even date herewith. The multi-thread complex packet processors contain several components, the descriptions of each, as set forth in the above copending application, are herein incorporated by reference.

Processors 12 of the packet router mechanism 10 are coupled via a bus infrastructure 14, for providing fast chip to chip processing of a plurality of data packets. The throughput of the data packets at a rate of about 10 gigabits per second. In addition to the processors 12, are interface members 16 and 18. The interface member 16 communicates the packet router mechanism 10 with the communication network. The interface member 18 of packet router mechanism 10 allows the packet router mechanism 10 to access at least one external memory device for the storing and retrieving data packet information during the processing of the data packets. The high speed data transfer across the bus infrastructure 14 involves a high speed access port.

Each of the processors 12 has two high speed ports. The data is source synchronous, i.e. the clock timing signals travel from the master to the slave in parallel along with the data and control signals. All signals being returned from the slave to the master (e.g. FIFO status flags) are completely asynchronous and are, therefore, synchronized at the master. These interface ports are based on a 64 bits @ 50 MHz bus using HSTL I/O technology and source synchronous clocking. This interface allows for up to 16 ports.

Figure 2:
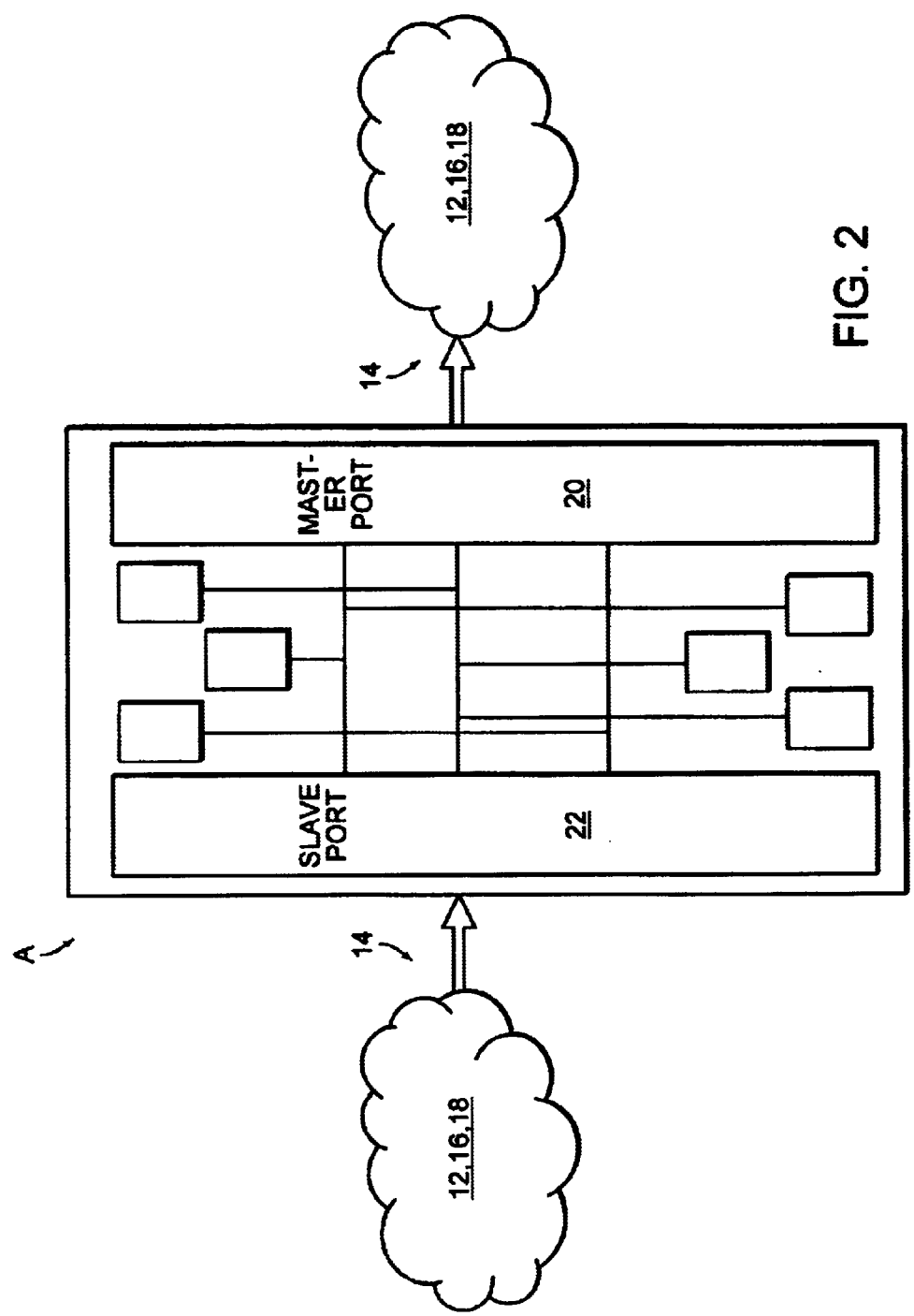
FIG. 2 is a block diagram of one processor of FIG. 1 showing the master and slave ports for interfacing the bus according to the present invention.

Turning to FIG. 2, the processor 12, designated as A in FIG. 1 for illustrative purposes, is shown having a master interface port 16 and a slave interface port 22. The master interface port 20 transfers the data packets approaching a rate of 10 gigabits per second (or faster) uni-directionally to the bus infrastructure 14. The slave port 22 transfers the data packets approaching a rate of 10 gigabits per second (or faster) uni-directionally from the bus infrastructure 14. The bus infrastructure 14 completes the data packet transfer in accordance with the present invention by transmitting or receiving the data packets to either another processor 12, to the host interface member 16 or the memory interface member 18.

The master interface port 20 includes a plurality of outputs and inputs, generally called pins. Each pin has a particular purpose in order to approach the data packet transfer at 10 gigabits per second or faster. The nature of a uni-directional interface such as the high speed access bus interface of the present invention, is that the processors 12 typically use both the master (20) and slave (22) interface ports. In this manner, either a full duplex, or an upstream/downstream datapath capability is established through the high speed access interface. In the operation of one embodiment, the high speed interface transfers data using a 64-bit wide data path and several control signals at an operational frequency of 50 MHz. The following signals are used to achieve one embodiment and these processors have both a master port 20 and a slave port 22. The signal pin names for each port are identified, along with their functions, as follows.

A clock pin, labeled 'clk', driven by the master port 20, generates a constant frequency (nominally 50 MHz) clocking or synchronization signal. The clocking signals travel with the data packets to the slave port 22. An enable pin, labeled 'enbl', asserted by the master port 20, is an active low signal during all valid data packet transfers. Within a packet, the 'enbl' can be deasserted, the deassertion of the 'enbl' signal will occur either autonomously by the master port 20 when a flow of data packets from an external data source is under predetermined flow rate. It is noted that between packets, 'enbl' is deasserted. The 'enbl' may also be deasserted by the master port 20 in response to the slave port 22, as set forth hereafter.

The next pin is labeled 'sop' for start of packet. The 'sop' signal asserted by the master port 20 during the first word of a data packet. It is only valid when 'enbl' is asserted. During the remaining words of the data packet the 'sop' signal is deasserted. The next pin corresponds to the end of a data packet and is labeled 'eop'. The master port 20 during the last word of a data packet asserts the 'eop' signal. It is only valid when 'enbl' is asserted and during the preceding words of the packet, the 'eop' signal is deasserted. The error pin, labeled 'Error', generates an error signal asserted by the master port 20 to indicate that the preceding data in this data packet is in error. The error signal also initiates to the slave port that the packet should be discarded. To be valid, the 'eop' and 'enbl' signals accompany the 'error' signal since this condition creates an end of packet condition. This will either cause a truncation of the remaining data in the original packet, or the error condition may have been held pending the last word of the original packet.

The 'prty' pin has a parity bit that is used for data word integrity purposes. For each valid data transfer, 'prty' is adjusted and driven by the master port 20 in order to make an odd number of bits high among the total of 65 bits, (64 Data bits+1 Parity bit).

A 3-bit field, driven by the master port 20 on the '1byte [2:0]' pin. The '1byte' pin indicates where the position of the last valid byte within the last valid 64-bit word of the data packet is (since not all packets are integral multiples of 8 bytes). The coding scheme is as follows:

'1byte[2:0]'='0 0 1' indicates that only 1 byte (Data [63:56]) is valid,

'1byte[2:0]'='0 1 0' indicates that only 2 bytes (Data [63:48]) are valid,

'1byte[2:0]'='0 1 1' indicates that only 3 bytes (Data [63:40]) are valid,

'1byte[2:0]'='1 0 0' indicates that only 4 bytes (Data [63:32]) are valid,

'1byte[2:0]'='1 0 1' indicates that only 5 bytes (Data [63:24]) are valid,

'1byte[2:0]'='1 1 0' indicates that only 6 bytes (Data [63:16]) are valid,

'1byte[2:0]'='1 1 1' indicates that only 7 bytes (Data [63:08]) are valid.

'1byte[2:0]'='0 0 0' indicates that all 8 bytes (Data [63:00]) are valid.

This field is only valid if the master port 20 asserts both 'eop' and 'enbl'.

The data packet signal at the 'data[63:0]' pin carries the 64 bits of data, driven by the master. The format is bit 63 on the left, bit 0 on the right; byte 0 on the left, byte 7 on the right, for all data packet transfers. Since the clock frequency is 50 MHz, these 64 bits provide a raw unidirectional bandwidth that approximates 10 gigabits per second, more particularly on the order of 12.8 gigabits per second. During data packet transfer, the parity calculation, asserted by the parity 'prty' bit is unaffected by the '1byte[2:0]' field, since '1byte[2:0]' reflects the validity of the contents of the 'data[63:00]' in terms of inclusion in the data packet only, and not inclusion in the parity calculation for the last word of the packet.

The slave port 22 asserts an available FIFO signal indicating that the buffer of the slave port has capacity to accept more data packet transfers. The available FIFO, 'AF', signal is deasserted by the slave port 22 if and/or when the FIFO of the slave approaches the full condition. The master port 20 pauses from sending valid data within a relatively short interval after the 'AF' deassertion is received, and the slave port 22 is capable of accepting data for a slightly longer interval in order to accommodate an apparent, yet negligible time differential across the interface bus. The 'AF' signal is treated as asynchronous by the master port 20 'clk' signal. Part of the delay in stopping or stalling data packet transfer in response to the 'AF' signal is the time required to re-synchronize the asynchronous 'AF' signal at the master port 20. In addition, there may be several stages of data pipeline at either end, which may drain into the FIFO in the slave port 22. The 'enbl' signal is deasserted by the master port 20 upon receipt of the 'AF' signal being deasserted by the slave port 22 when the slave FIFO approaches an almost full condition. The contents of the data bus are to be disregarded.

It is noted that the each pin of the master port 20 has a prefix "M" and the slave port 22 has a prefix "S", while the bus generally has no prefix. This is merely for the sake of clarity and not intended to limit the scope of the invention.

In this embodiment, the stopping or stalling on of the data packet transfer by the 'AF' signal is initiated by the slave port 22. If and/or when the FIFO of slave port 22 approaches an "almost full" condition, the 'AF' signal is negated. It is a clear expectation that the master port 20 will stop sending data into this FIFO. The stopping of data is done by the master port 20, and is signaled to the slave port 22 using the 'enbl' control signal. The use of the 'enbl' signal allows the master port 20 to validate (or invalidate), the data packet contents on the data bus 14 on each clock cycle. The response to the de-assertion of the 'AF' signal will not provide immediate relief at the FIFO because:

1. The 'AF' signal is asynchronous at the master port 20, and will be re-synchronized at the master port 20 with the 'clk' synchronization signal. Even though it appears that the slave port 22 and master port 20 are running synchronously, the uncertainty of the phase of the returning 'AF' signal requires that it be resynchronized at the master port 20.

2. After being synchronized in the HAB-Master, it may take a few clock cycles to interrupt the state machine logic that is driving the data onto the bus.

3. There may be pipelined data "in-flight" through the datapath of both the master port 20 and the slave port 22, which may take a few clock cycles to flush itself through the pipe and into the FIFO before the data flow actually stops.

For these reasons, a FIFO backpressure threshold in the slave port 22 should be set to account for this. The high speed access bus interface sets a limit on the response time by which the master port 20 has stopped enabling the data transfers. The value is intended to be great enough so that it can be met by any of the other processors 12, or any other potential device that includes a high speed access interface master port 20.

Also, it is understood that the device having slave port 22 is designed to operate with the specific value (or greater). This will ensure that there will have no difficulty interfacing with any high speed access bus master interface, which typically would have a response time which is less than the maximum predetermined value. This will prevent incompatible backpressure operation between slave port 22 and master port 20 designs.

Figure 4:
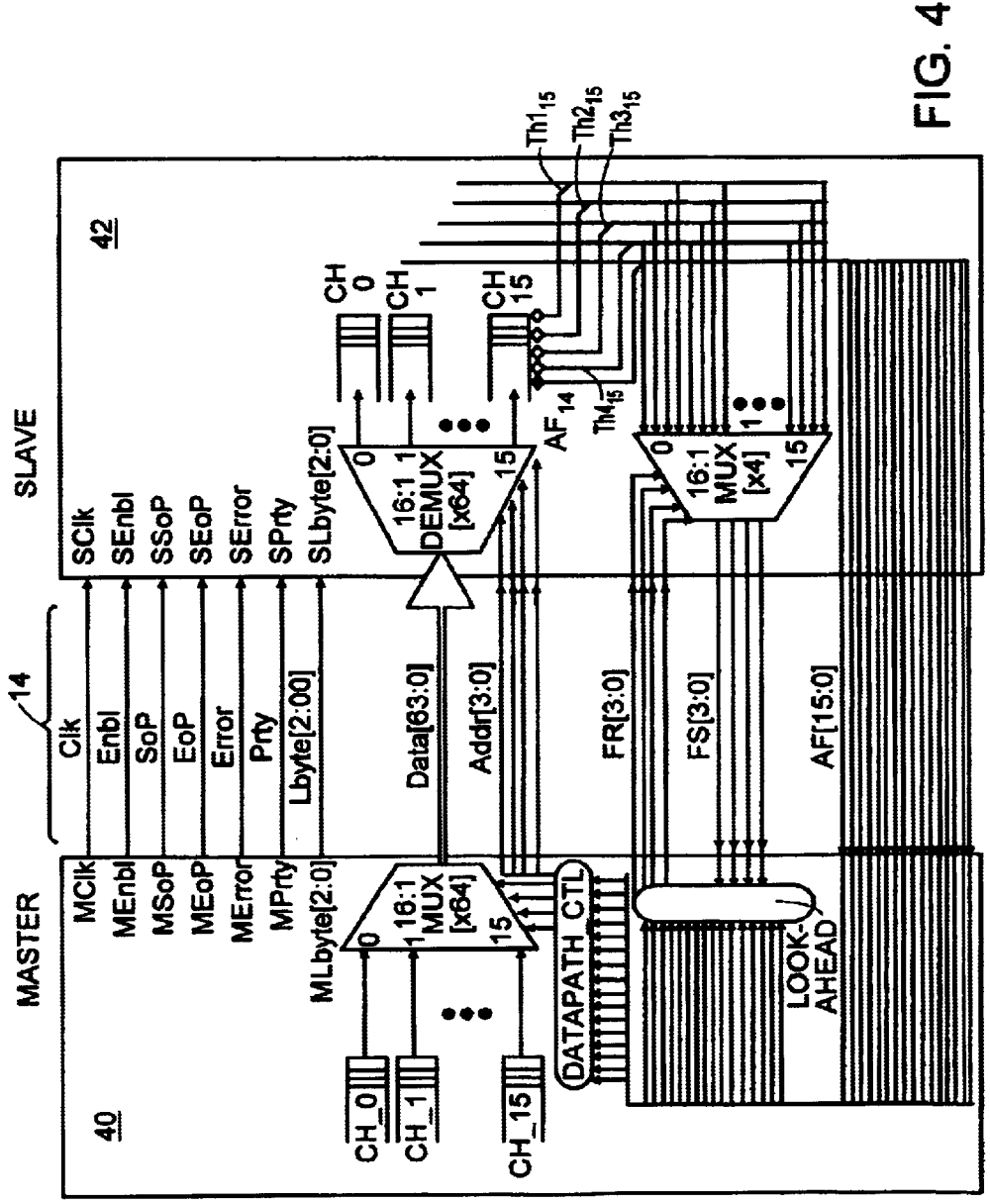
FIG. 4 a more detailed block diagram of the high speed access bus coupling a master port of one processor and a slave port of another processor.

In the second embodiment, the basic configuration of the high speed access port is expanded upon in order to offer wider capabilities. As seen in FIG. 4, the high speed access bus interface allows multiple data channels. The features of the second embodiment are all related to multiple channels in either master port 40 or slave port 42. The master port 40 and slave port 42 of FIG. 4 uses the following signals, to expand the features of multiple channels and multiple FIFO thresholds. In addition, the FIG. 4 embodiment allows multiple fullness threshold detection in each FIFO of each channel of the slave port 42.

The first embodiment of the high speed access bus interface uses only a single-channel data transfer capability of the interface. By expanding the capabilities of the first embodiment to allow multiple data channels and multiple fullness threshold detection, the usability and versatility of the high speed access bus interface of the present invention in greater increased. In addition to the signal pins of the master port 20 and slave port 22 of the FIG. 3, the master port 40 and the slave port 42 of FIG. 4 also includes the pins identified as:

Addr[3:0] is a 4-bit address field, driven by the master port 40, which is used, in reference to the main datapath, for one of two purposes. The first purpose is to select the destination channel in the slave port 42. Alternatively, the second purpose is to identify the source channel from which the data packet has come. The determination as to which purpose is selected is either a hardware design or software implementation of the master port 40.

FR[3:0] is a 4-bit FIFO request field, driven by the master port 40, which is used to select specific FIFO information of a specific channel in the slave port 42.

FS[3:0] is an a 4-bit FIFO status field which is asynchronously driven by the slave port 42, with status information about the FIFO for the channel specified in the FR[3:0]

signal. Each bit indicates whether or not the FIFO's depth is at or above a particular threshold value. This is typically a software programmable feature. The master port 40 resynchronizes these signals.

AF[15:1] is a collection of the "available FIFO" control signals asynchronously driven by the slave port 42. Each one designated for each channel in the slave port 42. These signals are used as the back-pressure control from the slave port 42 to the to the master port 40, to cause the master port 40 to stop sending data, in order to avert a FIFO overflow. These signals are resynchronized by the master port 40. The FIG. 3 embodiment includes an 'AF' signal which is equivalent to the 'AF[0]' if and/or when the slave port 42 has more than a single channel.

Figure 3:
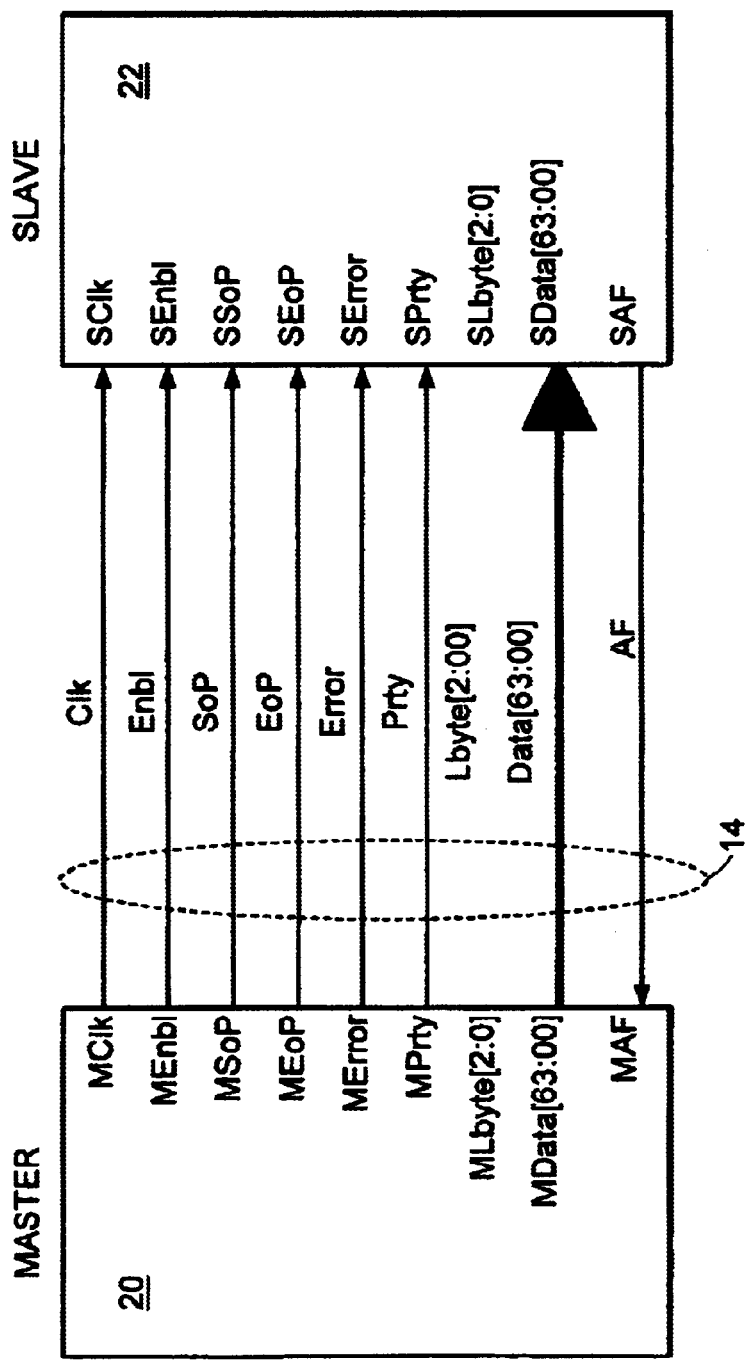
FIG. 3 is a detailed block diagram of the high speed access bus interface between a master port of one processor and a slave port of another processor.

The absence of these signals will not prevent the FIG. 3 embodiment from interfacing to other processors or devices that have some or all of these signals. The additional signals on the other devices will have to be left unconnected if master port outputs, or connected to appropriate logic levels if slave port inputs. The high speed access bus interface makes provision for both slave ports 42 and master ports 40 to have multiple channels, and the high speed access bus interface provides signals to communicate channel identification. These additional signal functions are an extension to the FIG. 3 embodiment of the high speed access bus interface functions.

If one end of the high speed access bus interface may have multiple channels while the other end does not. Generally, if multiple channels of a slave port 42 are used with a single channel master port 20, then the associated circuitry and high speed access bus interface signals can be simply omitted. Conversely the master port 40 is somewhat obliged to provide those signals necessary to operate the multiple channel facilities provided in the slave port 42 device. Similarly, the use of multiple threshold FIFO monitoring of the slave port 42 is feasible for the master port 20 without taking advantage of any multiple threshold detecting features available in the slave port 42.

The purposes for the FR[3:0] and FS[3:0] signals in the FIG. 4 embodiment for increases the usability and versatility. These signals across the bus 14 allow any or all of the channels of slave port 42 to be monitored for various FIFO depth thresholds. This is accomplished through some form of sequential access, as determined by the master port 40. Also, these signals can be used in a look-ahead fashion for the master port 40 to select subsequent slave port 42 channels. The standards for the FR[3:0] and FS[3:0] signals are basically, fewer than 4 thresholds per FIFO of the FS[3:0] signals, and fewer than the total number of slave port channels.

Further, the 'AF[15:0]' signals also contribute to such a look-ahead selection mechanism in addition to the FR[3:0] and FS[3:0] signals. This serves to maintain the high speed access of about 10 gigabits per second. The 'AF[15:0]' signals provide additional advantages of data packet signal throughput. For example, any number of slave port 42 channels is possible. Wherein the minimum of one 'AF[0]' defaults to 'AF', as set forth in the FIG. 3 embodiment. Also, the 'Addr[3:0]' signals control the multiplexer 'mux' to supply only one AF signal from the slave port 42 to master port 40.

The additional features of the 'ADDR[3:0]' signals are used to specify the destination channel in the slave port 42. Although, the master port 40 may use the same or different signals for internally selecting the source master port 40 channel. The 'ADDR[3:0]' signals are also used to specify the source channel in the master port 40, eventhough the slave port 42 may use these signals for tagging the selected data packet. In addition, the 'ADDR[3:0]' may use fewer than total number of slave port 42 channels.

The master port 20 provides the mechanism by which the packet router host mechanism 10 transmits packets. This is the transmit interface of the device. All signal timing is relative to the rising edge of the source synchronous TXCLK_OUT output unless specifically noted. The rising edge of TXCLK_OUT is skew matched to all master port 20 outputs.

TX_USERSP2—Transmit USE RSP2 CLOCK—This enable is used to switch between the TXCLK or the RSP2CLK domain synchronized TX_SPACE_AVAIL signal. When the signal is logic high, then the master port 20 uses the TX_SPACE_AVAIL signal synchronized to the RSP2CLK. If the signal is logic low, then the master port 20 uses the TX_SPACE_AVAIL signal from the input of the chip which can be synchronized to the internally generated request clock.

TX_DATA[63:0]—Transmit Data—Outputs—TX_DATA is used by the packet router host mechanism 10\*to transmit packet data to an external source. The source must comply with the packet router host mechanism 10 High-Speed ASIC Bus (HAB) I/F protocol. The packet router host mechanism 10 is a HAB master device that allows the useable bit widths to be configured by firmware to 32 or 64 bits. In 32-bit mode, the packet router host mechanism 10 will continuously drive all bits of TX_DATA[31:0] driven to '0'.

TX_DATA is valid only when TX_ENB_L is active on of the rising edge of the TXCLK.

TX_SPACE_AVAIL[15:0]—Transmit Space Available—Active High Inputs—TX_SPACE_AVAIL is used by an external HAB slave device to halt the packet router host mechanism 10 master port 20. The master port 20 transmits data as long as the slave is active high asserting TX_SPACE_AVAIL on the corresponding flag pin for the port selected by the TX_PORT signals, i.e. TX_SPACE_AVAIL[0] is for port 0 etc. The device should insure enough room is allowed on the input to account for synchronization, flight time and assertion ->5 packet router host mechanism 10 cycles minimum.

TX_ENB_L—Transmit Enable—Active Low Output—TX_ENB_L is used by the packet router host mechanism 10 to write TX_DATA into an external HAB slave device from the master port 20.

TX_LBYTE[2:0]—Transmit Last Byte—Outputs—TX_LBYTE is used by the packet router host mechanism 10 to indicate which bytes of the last word on the TX_DATA bus are valid. TX_LBYTE is required to be valid with TX_ENB_L active and TX_CTRL indicating end of packet (EOP) on the rising edge of TXCLK_OUT. TX_LBYTE may be valid or invalid on all non-EOP or non-enable cycles. TX_LBYTE is scaled for 32-bit mode with TX_LBYTE[2] set to '0'.

TX_PRTY—Transmit Parity—Input—TX_PRTY is an even or odd programmable parity bit covering TX_DATA. Parity is generated by the receiving HAB device and checked against the parity outputted on TX_PRTY by the RSP2. TX_PRTY is valid with TX_ENB_L active on the rising edge of TXCLK_OUT.

TX CTRL[1:0]—Transmit Control—Outputs—TX_CTRL is used by the packet router host mechanism 10 indicates the contents of the TX_DATA bus.

TX_CTRL is valid only with TX_ENB_L on the rising edge of TXCLK_OUT. COP marks the continuation of a packet, SOP marks the start of a new packet, EOP marks the end of a packet, and ERR indicates that the current packet transmitted by the master port 20 should be aborted and discarded by the HAB slave.

TX_PORT[3:0]—Transmit Port—Outputs—TX_PORT indicates which of the possible 16 sub-ports the current packet being transmitted out of the packet router host mechanism 10 is destined for. TX_PORT is optional, but required when the packet router host mechanism 10 is simultaneously supporting multiple output ports. TX_PORT is valid with TX_ENB_L on the rising edge of TXCLK_OUT.

TX_ACTIVE—Transmit Active—Active High Output—Transmit active is used during master sequencing with multiple RSP2s. When asserted high by an individual RSP2, the signal indicates that this packet router host mechanism 10 has the current master sequence number and is transmitting on the virtual output bus i.e., this packet router host mechanism 10 has ownership of the bus. Once an packet router host mechanism 10 is finished with the bus, TX_ACTIVE is asserted low. This signal will be typically used for mux control in the master sequence merging logic that is required. TX_ACTIVE is valid with TX_ENB_L on the rising edge of TXCLK_OUT.

TXCLK_OUT—Transmit Clock Output—Output—This signal is a source synchronous output clock HAB used to clock the receiving interface in the HAB slave device. The signal is generated off the packet router host mechanism 10 PLL compensated TXCLK.

SEQOUT_RST_L—Output Master Sequence Reset—Active Low Open Collector Bidirect—When master sequence mode is enabled, this signal, which can be asserted by any RSP2, resets all of the output master sequence logic. The signal is under full firmware control through the master port 20 configuration register. The BC1820PU_C I/O cell emulates an open collector Bidirect function. During normal operation, SEQOUT_RST_L will only be driven active low or pulled high through the use of the BC1820PU_C output enable.

SEQOUT_INCR[3:0]—Output Master Sequence Increment—Bidirectional SEQOUT_INCR is a Bidirectional bus that is configured at reset by firmware to 3 inputs and 1 output. The output bit is based on whether this packet router host mechanism 10 is considered RSP2-0, RSP2-1, RSP2-2 or RSP2-3. The output bit, and subsequently all of the input bits, are used to communicate with other RSP2s when using multiple RSP2s with master sequencing enabled. Each of the increments is asserted active high by the respective packet router host mechanism 10 5 cycles before it has just transmitted an "End Of Packet" out of the master port 20. All of the RSP2s use the signals to increment the output Master Sequence. The signal will be asserted for multiple cycles and edge detected by the receiving packet router host mechanism 10 to overcome any clocking issues. One note is that the increment is not pulsed until that last packet of a multicast packet sequence.

SEQOUT_PP_REQ_L—Master Sequence Priority Packet Request—Bidirect—The SEQOUT_PP_REQ_L is a Bidirect that uses the BC1820 pull up IO cell.

SEQOUT_PP_REQPASS—Master Sequence Priority Packet Request Pass—Bidirects SEQOUT_PP_GRNTIN—Master Sequence Priority Packet Grant In—Active High Input—SEQOUT_PP_GRNTOUT—Master Sequence Priority Packet Grant Out—Active High Output—SEQOUT PP[3:0]—Output Master Sequence Packet Priority—Bidirectional—SEQOUT_PP is a Bidirectional bus that is configured at reset by firmware to 3 inputs and 1 output. The output bit is based on whether this packet router host mechanism 10 is considered RSP2-0, RSP2-1, RSP2-2 or RSP2-3. The output bit, and subsequently all of the input bits, are used to communicate with other RSP2's when using multiple RSP2's with master sequencing enabled. The output is asserted high when the master port 20 receives a priority packet from the host.

This is determined by the master port 20 when a packets master sequence number is 12'hFFF. The packet priority signal remains asserted waiting for ownership of the bus (i.e., it waits for the current packets EOP). Once it has ownership, the output signal remains asserted acting essentially as a stall to the RSP2's with the next master sequence packet. The priority signal is deasserted 5 clock cycles before EOP. If no other packet router host mechanism 10 has a priority packet, normal operation of master sequence will continue with the next packet. If more than one packet router host mechanism 10 has a priority packet to transmit at the same time, then RSP2-0 has highest priority down to RSP2-3 having lowest priority.

TX_PM_PORT[3:0]—Transmit Packet Manipulator Port—Outputs—TX_PM_PORT indicates which of the possible 16 sub ports the current packet being modified in the PM is destined for. TX_PM_PORT is optional, but required when the packet router host mechanism 10 using TX_PM_BUFFER_AVAIL.

TX_BUFFER_AVAIL[3:0]—Transmit Buffer Available—Active High Inputs—TX_BUFFER_AVAIL is used by an external HAB slave device to inform the PM as to exactly how much buffer room is available for the port designated by TX_PM_PORT. This allows the PM to make a drop based on packet size, priority, and buffered room. This can be used to allocate different types of problems and is completely optional. This occurrence is highly unlikely for the BFR, but included for reassurance. Each flag is programmable in the receiving HAB slave device. Currently, the flags should be specified to 64 bytes, 256 bytes, 1k bytes and 4500 bytes.

The slave port 22 provides the mechanism by which the packet router host mechanism 10 receives packets. This is the receive interface of the device. All signal timing is relative to the source synchronous RXCLK unless specifically noted.

RX_SPACE_AVAIL—Receive Space Available—Active High Output—RX_SPACE_AVAIL is used by the packet router host mechanism 10 to halt a HAB master device. The signal is an indication to the external device that space is available to push the next word of data over RX_DATA into the packet router host mechanism 10 slave port 22, i.e. not full. The packet router host mechanism 10 will de-assert the flag when 5 locations are left in the slave port 22 staging FIFO. This should allow 5 cycles for flight time, synchronization by the transmitting device, and for writes in progress.

RX_ENB_L—Receive Enable—Active Low Input—RX_ENB_L is used by an external HAB master device to write the RX_DATA into the slave port 22 staging FIFO.

RX_DATA[63:0]—Receive Data—Inputs—RX_DATA is used by the packet router host mechanism 10 to receive packet data from an external source. The source must comply with the packet router host mechanism 10 High-Speed ASIC (HAB) I/F protocol. The packet router host mechanism 10 receive interface is a slave HAB device that allows the useable bit widths to be configured by firmware to 32 or 64 bits. In 32-bit operation, RX_DATA[31:0] should be pulled active low. RX_DATA is valid only when RX_ENB_L is active and on the rising edge of RXCLK.

RX_PRTY—Receive Parity—Input—RX_PRTY is an even or odd programmable parity bit covering RX_DATA with the default being odd parity. Parity is generated by the slave port 22 and checked against RX_PRTY sent by the HAB master. RX_PRTY is valid only with RX_ENB_L active on the rising edge of RXCLK.

RX_LBYTE[2:0]—Receive Last Byte—Input—RX_LBYTE is used by the external HAB master to indicate what the valid bytes are for the last word on the RX_DATA bus. RX_LBYTE is valid only on the rising edge of RXCLK with RX_ENB_L and RX_EOP active. RX_LBYTE is scaled for 32-bit mode with RX_LBYTE[2] ignored.

RX_SOP—Receive Start of Packet—Input—RX_SOP is used by the HAB master to indicate the start of a new packet on the bus. RX_SOP is valid only with RX_ENB_L at the rising edge of RXCLK.

RX_EOP—Receive End of Packet—Input—RX_EOP is used by the HAB master to indicate the end of a packet on the bus. RX_EOP is valid only with RX_ENB_L at the rising edge of RXCLK.

RX_ERR—Receive Packet Error—Input—RX_ERR is used by the HAB master to indicate that the current packet received by the slave port 22 should be aborted and discarded.

RX_PORT[3:0]—Receive Port—Input—RX_PORT indicates which of the possible 16 sub ports the current packet being received into the packet router host mechanism 10 is from. RX_PORT is optional, but required when the packet router host mechanism 10 is simultaneously supporting multiple input sources. RX_PORT is valid only when RX_ENB_L is active on the rising edge of RXCLK.

SEQIN_RST_L—Input Master Sequence Reset—Active Low "Open Collector" Bidirect—When master sequence mode is enabled, this signal, which can be asserted by any RSP2, resets all of the input master sequence logic. The signal is under full firmware control, through the slave port 22 Configuration Register. The BC1820PU_C emulates an open-collector Bidirect function. During normal operation, SEQIN_RST_L will be driven active low or pulled high through the use of the BC1820PU_C output enable.

SEQIN_INCR[3:0]—Input Master Sequence Increment—Bidirectional—SEQIN_INCR is a Bidirectional bus which is configured at reset by firmware to 3 inputs and 1 output. The output bit is based on the whether this packet router host mechanism 10 is considered RSP2-0, RSP2-1, RSP2-2 or RSP2-3. The output bit, and subsequently all of the input bits, are used to communicate with other RSP2s when using multiple RSP2s with master sequencing enabled. Each of the increments is asserted active high by the respective packet router host mechanism 10 when it has just received a "Start Of Packet" into its slave port 22. All of the RSP2s use the signals to increment the input Master Sequence. The signal will be asserted for multiple cycles and edge detected by the receiving packet router host mechanism 10 to overcome any clocking issues. For further details, see Chapter 6, System Usage, and Chapter 10, Operations.

AM_TA—Analysis Machine Thread Available—Active High Output—AM_TA indicates that there are inactive threads in at least one of the 4 packet router host mechanism 10 analysis machines. The signal may be used by an external arbiter in deciding whether a given packet router host mechanism 10 is too busy for more packets. An external arbiter for packet direction is needed when using multiple RSP2s in conjunction with master sequencing enabled. AM_TA timing is relative to the RSP2CLK, not RXCLK.

RX_BUFFER_AVAIL[3:0]—Receive Buffer Available—Active High Outputs—Each signal represents that the packet router host mechanism 10 slave port 22 has the available buffering as specified. Bit 0 indicates there are at least 64 bytes available in the slave port 22, bit 1 indicates 256 bytes, bit 2 indicates 1k bytes and bit 3 indicates 4500 bytes. The signals indicate how full the packet router host mechanism 10 is. These can be used when pipelining multiple RSP2's connecting them to the RX_BUFFER_AVAIL[3:0]. This allows PM drop capabilities.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A high speed interface for fast path processing of a plurality of data packets comprising:
a master port for uni-directionally transferring the data packets;
a slave port for uni-directionally receiving the data packets; and
a bus infrastructure configured to accommodate the uni-directional transfer of the data packets, said master port and said slave port being coupled to said bus infrastructure;
wherein said master port includes a source for generating synchronization signals, a first source generating a first identification signal indicating the beginning of each data packet, and a second source generating a second identification signal indicating the completion of each data packet, said first identification signal and said second identification signal each having one of said synchronization signals assigned thereto;
wherein said slave port includes a receiver for receiving said synchronization signals, said first identification signal and said second identification signal, said synchronization signals confirming the receipt of each data packet via identifying the beginning and the completion of each data packet; and
wherein said master port transfers the data packets to the slave port across the bus infrastructure at a rate of about 10 gigabits per second.

2. The high speed interface of claim 1, wherein said master port further includes a third signal for generating a data packet transfer error signal, said error signal configured to identify when a preceding data packet should be discarded and contains one of said synchronization signals assigned thereto.

3. The high speed interface of claim 1, wherein said synchronization signals are clock pulses having a frequency of at least 50 MHz.

4. The high speed interface of claim 3, wherein said master port further includes a fourth signal source for initiating said slave port to receive the data packets, a fifth signal source for maintaining data word integrity of the data packets at said slave port, and a sixth signal source for inquiring said slave port for the received data packets status.

5. The high speed interface of claim 3, wherein said slave port further includes a seventh signal source for temporarily stalling the transfer of the data packets from said master port, and an eigth signal source for replying to an inquiry signal of the received data packets.

6. A high speed interface for providing fast chip to chip path processing of data packets comprising:
a master port and a slave port, said master port and said slave port providing a uni-directional datapath for a plurality of data packets; and
a bus coupled to said master port and said slave port and configured to communicate the plurality of data packets from said master port to said slave port;
said master port including a master clock pin transmitting a series of source pulses, a master enable pin, a master start of packet pin, a master end of packet pin, and a master error pin;
said slave port including a slave clock pin receiving said series of source pulses, a slave enable pin, a slave start of packet pin, a slave end of packet pin, and a slave error pin;
said bus including a bus clock datapath for linking said master clock pin to said slave clock pin, a bus enable datapath for linking said master enable pin to said slave enable pin, a start of packet datapath for linking said master start of packet pin to said slave start of packet pin, an end of packet datapath for linking said master end of packet pin to said slave end of packet pin, and an error datapath for linking said master error pin to said slave error pin,
wherein the plurality of data packets are uni-directionally transferred at a rate of about 10 gigabits per second from said master port to said slave port via said bus, said transmitted source pulses and said received sources pulse providing synchronization of the transfer of the data packets across said bus.

7. The high speed interface of claim 6, wherein said master port further includes a master data pin; said slave port further includes a slave data pin; and said bus further includes a datapath for linking said master data pin to said slave data pin;
wherein said master data pin drives 64 bits of data through said bus in a uni-directional flow to said slave data pin at said rate of about 10 gigabits per second.

8. The high speed interface of claim 7, wherein said master clock pin asserts a clocking signal to the slave clock pin across the bus clock datapath at a frequency of at least 200 MHz.

9. The high speed interface of claim 8, wherein said master port further includes a master last valid byte pin; said slave port includes a last valid byte pin; and said bus includes a last valid byte datapath for linking said master last valid byte pin to said slave last valid byte pin.

10. The high speed interface of claim 8, wherein said master port further includes a master a parity pin; said slave port further includes parity pin; and said bus further includes a parity datapath for linking said master parity pin to said slave parity pin.

11. The high speed interface of claim 6, wherein said slave port further includes a slave almost full pin, said master port further includes a master almost full pin, and said bus further includes an almost full datapath, said slave almost full pin transmitting to said master almost full pin an asynchronous signal across said bus almost full datapath said asynchronous signal triggering said master port to deassert said master enable pin such that said master port stalls the transmission of the data packets across said bus.

12. A packet router mechanism, having a plurality of switching processors coupled via a bus infrastructure, configured to provide chip to chip processing of a plurality of data packets, each of said switching processors comprising:
a master interface port for transferring a first set of data packets to the bus infrastructure, said master interface port including a source for generating synchronization signals, a first source generating a first identification signal for the beginning of each data packet, and a second source generating a second identification signal for the completion of each data packet, said first identification signal and said second identification signal each having one of said synchronization signals assigned thereto corresponding to said first set of data packets; and
a slave interface port for receiving a second set of data packets from the bus infrastructure, said slave interface port including a receiver for receiving synchronization signals, a third identification signal for identifying beginning of each one of said second set of data packets, and a fourth identification signal for identifying completion of each one of said second set of data packets, said synchronization signals confirming the receipt of each data packet by identifying the beginning and the completion of each data packet of said second set of data packets, wherein said master port transfers the first set of data packets to the bus infrastructure at a rate of about 10 gigabits per second, and said slave port receives the second set of data packets from the bus infrastructure at a rate of about 10 gigabits per second.

13. The packet router mechanism of claim 12, wherein said master port further includes a third signal source for generating a data packet transfer error signal to identify when one of said first set of data packets should be discarded, said error signal having one of said synchronization signals assigned thereto;

wherein each of said synchronous signals are clock pulses having a frequency of at least 50 MHz.

14. The packet router mechanism of claim 12, wherein said master port further includes a fourth signal source for initiating a succeeding slave port to receive the data packets, said initiating signal having one of said synchronization signals assigned thereto;

wherein each of said synchronous signals are clock pulses having a frequency of at least 50 MHz.

15. The packet router mechanism of claim 12, wherein said master port further includes a fifth signal source for maintaining data word integrity of the data packets at said succeeding slave port, said fifth signal having one of said synchronization signals assigned thereto;

wherein each of said synchronous signals are clock pulses having a frequency of at least 50 MHz.

16. The packet router mechanism of claim 12, wherein said master port further includes a sixth signal source for inquiring said succeeding slave port for the received data packets status, said sixth signal having one of said synchronization signals assigned thereto;

wherein each of said synchronous signals are clock pulses having a frequency of at least 50 MHz.

17. The packet router mechanism of claim 12, wherein said slave port further includes a seventh signal source for temporarily stalling the transfer of the data packets from a preceding master port, said stalling signal having one of said synchronization signals asynchronously assigned thereto;

wherein each of said synchronous signals are clock pulses having a frequency of at least 50 MHz.

18. The packet router mechanism of claim 12, wherein said slave port further includes an eighth signal source for replying to an inquiry signal received from said preceding master port for the said second set of data packets, said replying signal having one of said synchronization signals asynchronously assigned thereto;

wherein each of said synchronous signals are clock pulses having a frequency of at least 50 MHz.

19. A method for fast chip to chip path processing of data packets in a switching processor containing a master port and a slave port coupled to a bus; said method comprising:

generating, by said master port, a clocking signal for synchronization;

providing, by said master port, an enable signal for initiating a valid transfer of data packets;

providing, by said master port, a first signal identifying the start of each data packet transfer;

providing, by said master port, a second signal identifying the end of the data packet transfer;

providing, by said master port, an error signal for identifying a corrupted data packet transfer, the error signal initiating the discard of the corrupted data packet;

providing, by said master port, a parity indication of the data packet for word integrity;

providing, by said master port, an indicating signal for identifying the last valid byte of a data packet transfer; and generating, by said slave port, a signal for stalling the data packet transfer;

wherein the signal for stalling the data packet transfer temporarily ceases transmission of data packets from the master port across the bus until the previously transmitted data packets have been processed; and wherein said data packets transfer is at a rate of about 10 gigabits per second.

20. A method for fast path processing of a plurality of sets of data packets in a routing switch mechanism having a bus infrastructure and a plurality of processors, each processor including a master port coupled to the bus and a slave port coupled to the bus, the method comprising:

generating a synchronizing clock signal by each master port;

initiating a transfer of one set of data packets by each master port;

identifying the start of each data packet set transfer by each master port;

identifying the end of the data packet set transfer by each master port;

identifying any corrupted word in a data packet of each data packet set transfer by each master port;

discarding each data packet identified as having a corrupted word by the slave port;

indicating the parity of each data packet of each data packet set for maintaining data integrity by each master port;

identifying the last valid byte of data in the data packet transfer by each master port;

generating a stall signal by said slave port when a data pipeline of the slave port approaches a predetermined maximum storage capacity, the stall signal having an asynchronous clock signal associated therewith; and stalling the transmission at the master port of data temporarily until the previously transmitted data packets have been processed through the slave port;

wherein the transmission of each set of data packets is at a rate of about 10 gigabits per second.

* * * * *